(12) United States Patent
Stucko (10) Patent No.: US 12,311,651 B2
(45) Date of Patent: May 27, 2025

(54) SUSTAINABLE WEARABLE ITEM AND METHOD OF MANUFACTURING SAME

(71) Applicant: PROTA FIORI, New York, NY (US)

(72) Inventor: Jennifer Stucko, New York, NY (US)

(73) Assignee: PROTA FIORI, New York, NY (US)

( * ) Notice: Subject to any disclaimer, the term of this patent is extended or adjusted under 35 U.S.C. 154(b) by 0 days.

(21) Appl. No.: 18/082,736

(22) Filed: Dec. 16, 2022

(65) Prior Publication Data
US 2023/0191748 A1    Jun. 22, 2023

Related U.S. Application Data

(60) Provisional application No. 63/290,249, filed on Dec. 16, 2021.

(51) Int. Cl.
*B32B 9/04* (2006.01)
*A43B 1/023* (2022.01)
(Continued)

(52) U.S. Cl.
CPC ............... *B32B 9/04* (2013.01); *A43B 1/023* (2022.01); *A43B 1/025* (2022.01); *B32B 3/08* (2013.01);
(Continued)

(58) Field of Classification Search
CPC .. B32B 9/04; B32B 9/02; B32B 9/025; B32B 7/12; B32B 2317/08; B32B 2317/18; A43B 23/0255
See application file for complete search history.

(56) References Cited

U.S. PATENT DOCUMENTS

2008/0229612 A1* 9/2008 Sommer .............. A43B 17/102
  36/43
2009/0301347 A1* 12/2009 Volcan .................... A23B 7/02
  106/206.1
(Continued)

FOREIGN PATENT DOCUMENTS

WO    2021250156 A1    12/2021

OTHER PUBLICATIONS

International Search Report and Written Opinion to corresponding International Application No. PCT/US22/53262, , mailed May 15, 2023 (9 pages).
(Continued)

*Primary Examiner* — Daniel McNally
(74) *Attorney, Agent, or Firm* — James J. DeCarlo; Greenberg Traurig, LLP (57) ABSTRACT

In the embodiments, sustainable wearable items are provided. In some embodiments, the sustainable wearable item can include an upper comprising an upper layer including an upper material selected from the group consisting of upcycled apple skin, sustainable satin, a combination of upcycled apple skin and tea bag recycled yarn, recycled polyamide yarn, and a combination of upcycled apple skin and recycled polyamide yarn, a lining including a material selected from the group consisting of upcycled apple skin and upcycled grape skin, and a first adhesive to bind the upper layer and the lining. In some embodiments, the sustainable wearable item can include a bottom comprising an insole including a material selected from the group consisting of upcycled apple skin and upcycled grape skin, an outsole including vegetable tanned leather, and a second adhesive to bind the insole and the outsole.

17 Claims, 4 Drawing Sheets

(51) Int. Cl.
  *A43B 1/025*   (2022.01)
  *B32B 3/08*    (2006.01)
  *B32B 7/12*    (2006.01)
  *B32B 9/02*    (2006.01)
  *B32B 37/12*   (2006.01)

(52) U.S. Cl.
  CPC .................. *B32B 7/12* (2013.01); *B32B 9/02* (2013.01); *B32B 9/025* (2013.01); *B32B 37/1207* (2013.01); *B32B 2255/26* (2013.01); *B32B 2317/08* (2013.01); *B32B 2317/18* (2013.01); *B32B 2437/02* (2013.01)

(56) References Cited

U.S. PATENT DOCUMENTS

2020/0221812 A1\* 7/2020 Isse .................. A43B 13/026
2022/0167705 A1   2/2022 Stucko

OTHER PUBLICATIONS

CTCP Portugal, "Sustainable Materials and Components for Footwear," 34 pages (2016).

\* cited by examiner

SUSTAINABLE WEARABLE ITEM AND METHOD OF MANUFACTURING SAME

RELATED APPLICATIONS

This application claims the benefit of priority from U.S. Provisional Application No. 63/290,249, filed Dec. 16, 2021, which is incorporated herein by reference in its entirety.

FIELD OF THE INVENTION

The present disclosure relates to sustainable wearable items and, in particular, to footwear manufactured using upcycled, recycled, recyclable, and regenerated materials.

BACKGROUND

As sustainability becomes a central requirement for manufacturers and consumers, fashion trends are trying to catch up with sustainability trends.

However, fashion designers and manufacturers have lagged on the development of truly sustainable clothing and footwear that is also stylish and durable. Selecting appropriate materials to use in sustainable wearable items has proven difficult as most materials do not cooperate together to assemble a satisfactory end product. Many sustainable materials are not thick nor durable enough and would tear, fray, or deform (e.g., by bubbling) when used to assemble, for instance, a shoe.

Additionally, selecting the right material is only part of the problem. Finding an appropriate thickness for each material that allowed for a resilient and durable final product while withstanding the stresses of manufacturing and achieving a desirable finish is equally challenging.

Resistance to snagging, pilling, and abrasion, as well as increased bursting strength and recovery are all substantial properties desirable in footwear. However, achieving these qualities is a problem with most sustainable materials, especially when applied to footwear. In some cases, a material can be abrasion resistant, but lack high recovery power. A similar challenge can arise when selecting an appropriate adhesive to bind the several layers of the several components of the wearable item. To achieve effective and durable adhesion, some adhesives require application temperatures and pressures that are inconsistent with desirable sustainable materials. In some cases, a material can be durable, but it may not readily bind to another material using traditional techniques (e.g., traditional temperatures and drying times).

SUMMARY

This disclosure provides a novel process of manufacturing wearable items using sustainable materials that results in a strong, smooth and durable final product while also being aesthetically desirable.

An aspect of the present disclosure is sustainable wearable item including a layer arrangement. In some aspects, the layer arrangement includes an inner layer comprising a plant-based material; the inner layer configured to contact the skin of a user; an outer layer comprising an animal hide-based material; and an adhesive disposed between the outer layer and the inner layer and configured to bind the outer layer to the inner layer.

An aspect of the present disclosure is a method of manufacturing a sustainable wearable item. In some aspects, the method includes preparing an inner layer and an outer layer; applying an adhesive to at least one of the inner layer and the outer layer, the inner layer comprising a plant-based material, the outer layer comprising animal hide-based material; activating the adhesive by heating the at least one of the outer layer and the inner layer; compressing the outer layer and the inner layer; and waiting a period of time prior to manipulating the layers.

Another aspect of the present disclosure is a sustainable wearable item. In some aspects, the sustainable wearable item can include an upper comprising an upper layer including an upper material selected from the group consisting of an upcycled apple skin material, sustainable satin material, a combination of an upcycled apple skin material and a tea bag recycled yarn material, a recycled polyamide yarn material, and a combination of upcycled apple skin material and recycled polyamide yarn material, a lining including a lining material selected from the group consisting of an upcycled apple skin material and an upcycled grape skin material, and a first adhesive disposed between the upper layer and the lining and configured to bind the upper layer and the lining. In some aspects, the sustainable wearable item can include a bottom comprising an insole including an upcycled grape skin material, an outsole including a vegetable tanned leather material, and a second adhesive disposed between the insole and an outsole and configured to bind the insole and the outsole.

While the methods, techniques, materials, and elements in the various embodiments are described in relation to footwear, other wearable items such as boots, slippers, sneakers, handbags, belts, wallets, satchels, backpack, or other items traditionally made of unsustainable leather or synthetic materials are also within the scope of this disclosure. In some embodiments, the methods, techniques, materials, and elements described herein can be used in the manufacture of furniture, automobiles, and aircraft.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter can be embodied as methods, devices, articles components, or compositions.

Throughout the specification and claims, terms can have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations o f example embodiments in whole or in part.

In general, terminology can be understood at least in part from usage in context. For example, terms, such as "and", "or", or "and/or," as used herein can include a variety of meanings that can depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and, instead, allow for existence of additional factors not necessarily expressly described, again, depending at least in part on context.

As used herein, the term "upper" refers to the part of a shoe that covers the foot. In some embodiments, the upper of a shoe can include all parts or sections of the shoe above the shoe bottom. In some embodiments, the upper of the shoe can include a vamp (or front of the shoe), quarters (e.g., the sides and back of the shoe), accessories (e.g., as a tie or a clasp), and linings.

As used herein, the term "lining" refers to the part of a shoe that contacts at least one of the sides, top, and heel of a foot or otherwise contacts the skin of a user. In some embodiments, the lining can cover an inside seam of the shoe. In some embodiments, the lining can protect the inside of the shoe and lengthen the shoe's lifespan. In some other embodiments, linings can be manufactured out of materials that add cushion and comfort to the shoe and draw out moisture.

As used herein the term "insole" refers to a piece of material placed inside the shoe. Generally, insoles are intended to make shoes more comfortable to wear. In some embodiments, insoles can add comfort, warmth, and allow for a better fit. In some embodiments, insoles can be referred to as "foot beds" or "inner soles."

As used herein, the term "outsole" refers to the outer sole of a shoe. In some embodiments, at least a portion of the outsole contacts the ground.

As used herein, the term "bottom" refers to the part of a shoe including the insole, the outsole, and anything in-between.

As used herein, the term "heel" refers to material inside of the shoe that creates height.

As used herein, the term "heel layer" refers to the portion of the shoe protruding from the outsole to raise and support the back of the foot. In some embodiments, the heel layer can include several layers of materials. In some embodiments, the heel layer can be a single piece of material.

As used herein, the term "insole cushion" refers to material between the insole and the outsole. In some embodiments, the insole cushion is a firm material that provides support to the construction of the shoe. As used herein, the term "molded insole" refers to a material disposed between the insole cushion and the insole.

As used herein, the term "counter" refers to the portion of the shoe forming the back of the shoe to give support to the user and stiffen the material around the heel of the foot.

As used herein, the term "toe puff" refers to a piece of material or materials disposed between lining and the outside of the upper (e.g., an upper layer) in the toe of a shoe. In some embodiments, the toe puff can act as a stiffener. In some embodiments, the toe puff can include at least one of a fabric, a plastic, and a metal.

As used herein, the term "upcycled" refers to the process of recycling material in such a way that the resulting product is greater in value than the original item for new use to minimize the flow of waste into landfills.

As used herein, the term "recycled" refers to the use of materials that have been extracted, reclaimed, and reconditioned for a new use to minimize the flow of waste into landfills.

As used herein, the term "tannery waste" refers to post-production leather scraps.

As used herein, the term "post-production" refers to the stage after production or manufacturing.

As used herein, the term "vegetable tanned leather" refers to leather that is tanned with natural tannins from tree bark and chestnut extract. In some embodiments, vegetable tanned leather is chemical free. In some embodiments, can include leather from animal hides such as cows.

As used herein, the term "nickel free metal" refers to metal with little to no nickel.

As used herein, the term "recycled cardboard" refers to cardboard that has been reused to make a new material.

As used herein, the term "polyurethane" refers to a polymer composed of organic units joined by carbamate (urethane) links.

As used herein, the term "viscose" refers to a rayon fabric or fiber made from viscose.

As used herein, the term "nylon" refers to a silk-like thermoplastic, generally made from petroleum, that can be melt and processed into fibers, films, or shapes.

As used herein, the term "elastane" refers to fibers based on polyurethane.

As used herein, the term "OEKO-TEX® Standard 100 Certification" refers to a certification indicating that the goods meet the human-ecological requirements of the OEKO-TEX® Standard 100. As will be noted the OEKO-TEX® Standard 100 Certification is one of the world's best-known labels for textiles tested against harmful substances and indicates that the goods are harmless to human health. Said certification can communicate customer confidence and high product safety.

As used herein, the terms "Global Recycled Standard Certification," "GRS Certification" or "GRS" refers to a certification promoted by the Textile Exchange organization (one of the most important non-profit organizations that internationally promote responsible and sustainable development in the textile sector). With this standard, the Textile Exchange recognizes the fundamental importance of recycling for the growth of a model of sustainable production and consumption; aims to encourage the reduction of resource consumption (virgin raw materials, water, and energy) and to increase the quality of recycled products. The GRS provides for the issue of a third party verified environmental statement which proves the content of recycled materials of their products and compliance with environmental and social criteria in all the production chain. In some embodiments, GRS certification can indicate that the products are composed of at least 20% of pre-consumer and post-consumer recycled materials.

As used herein, the terms "Istituto Per La Certificazione Etica Ed Ambientale" or ICEA refers to a non-profit consortium involving institutions, associations, companies, and civil society organizations, which for over twenty years have contributed to the dialogue and promoted the development of organic farming in Italy.

As used herein, the terms "Global Organic Textile Standard" and "GOTS" refers to a worldwide leading processing standard for organic textiles and fibers, including ecological and social criteria, backed by independent certification of the entire textile supply chain.

As used herein, the term "eco-responsible" refers to persons, organizations, products, and behaviors that are environmentally responsible and friendly.

As used herein, the term "compostable" refers to products and materials that can be disintegrated or broken down into non-toxic natural elements that will not harm the environment, given the right conditions.

As used herein, the term "biodegradable" refers to products and materials that can be broken down into increasingly smaller pieces to be reabsorbed into the environment, ideally without causing any pollution.

As used herein, the terms "Forest Stewardship Council" and "FSC" refer to an international non-profit, multi-stakeholder organization established in 1993 that promotes responsible management of the world's forests. It is an example of a market-based certification program used as a transnational environmental policy.

As used herein, the term "FSC Certified" indicates products certified by the FSC to ensure that the products come from responsibly managed forests that provide environmental, social, and economic benefits.

As used herein, the terms "Programme for the Endorsement of Forest Certification" and "PEFC" refer to global alliance of national forest certification systems. As an international non-profit, non-governmental organization, the PEFC is dedicated to promoting sustainable forest management through independent third-party certification.

As used herein, the term "PEFC Certified" indicates products certified by PEFC to ensure that the product is from responsibly managed forests and controlled sources.

Figure 1:
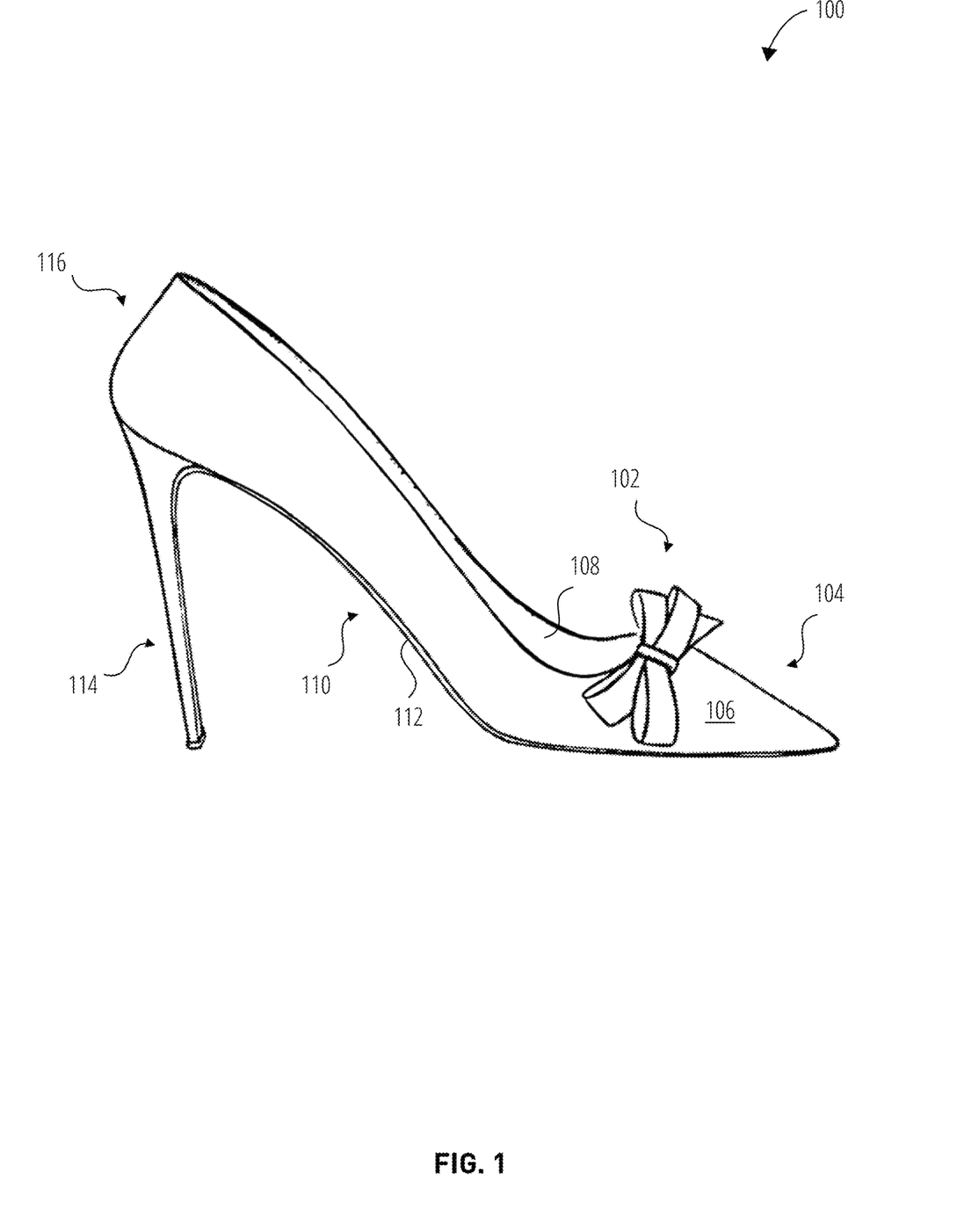
FIG. 1 is a side view of a sustainable wearable item according to some embodiments.

FIG. 1 is a side view of a sustainable wearable item according to some embodiments.

As illustrated, in some embodiments, the sustainable wearable item 100 can be a shoe. In some embodiments, a wearable item 100 can include an upper 102, a toe puff 104, a lining 108, a bottom 110, an outsole 112, a heel 114, and a counter 116. While not shown, In some embodiments, a wearable item 100 can also include an insole (not shown). In some embodiments, wearable item 100 can include a molded insole (not shown). In some embodiments, some or all of the components of a wearable item 100 can include recycled, upcycled, recyclable, and regenerated materials. In some embodiments, at least one of an upper 102, a toe puff 104, a lining 108, a bottom 110, an outsole 112, a heel 114, a counter 116, an insole, and a molded insole can be secured to at least one other component through a bonding process using an adhesive as described herein.

In some embodiments, the upper 102 includes the toe puff 104. In some embodiments, the upper 102 (including the toe puff 104) can include a layer arrangement including the lining 108 and an upper layer 106 (e.g., layer arrangement 400 described in relation to FIG. 4). In some embodiments, the lining 108 can be referred to as an inner layer. In some embodiments, the upper layer 106 can be referred to as an outer layer.

In some embodiments, the bottom 110 can include the insole and the outsole 112. In some embodiments, bottom 110 can include a layer arrangement including the insole and the outsole 112 (e.g., layer arrangement 500 described in relation to FIG. 5). In some embodiments, the insole can be referred to as an inner layer. In some embodiments, the outsole 112 can be referred to as an outer layer.

In some embodiments, an upper 102 can include an upper material. In some embodiments, the upper material and the upper layer 106 can refer to the same part. In some embodiments, the upper material can include an upcycled apple skin material. In some embodiments, an upcycled apple skin material can be a plant-based leather alternative composed of the post-production scraps of apple waste and polyurethane. In some embodiments, the upper material can include a material similar to AppleSkin™ manufactured by FRUMAT S.r.L./MABEL S.r.L. of Italy. In some embodiments, the upper material including an upcycled apple skin material can be U.S. Department of Agriculture (USDA) Certified as a Biobased Product and be labeled as such. In some embodiments, up cycled apple skin material can be water resistant. In some embodiments, upcycled apple skin material can be ultra-violet (UV) light resistant.

In some embodiments, the upper material can be a weaving including upcycled apple skin material. For example, in some embodiments, rolls of the upcycled apple skin material can be cut into 3 mm wide strips. In some embodiments, the rolls can be 140 cm wide. In some embodiments, the weavings have no joints or junction points. Then, in some embodiments, warp strips and weft strips can be separated. In some embodiments, the warp strips (e.g., 190 warp strips) and the weft strips can be put in a loom and woven. In some embodiments, a cotton backing cloth can be applied to the weaving. Then, in some embodiments, the weaving with the cotton backing can be ironed to flatten the weaving. In some embodiments, ironing the weaving can create a better hold of the backing cloth.

In some embodiments, the upper material including the apple skin material can have a thickness larger than or equal to 0.90 mm and smaller than or equal to 1.10 mm. In some embodiments, the upper material can have a thickness of 1.00 mm. In some embodiments, the upper material can have a thickness smaller than 0.90 mm. In some embodiments, the upper material can have a thickness larger than 1.10 mm. As will be understood by those skilled in the art, the thickness of the upper material may differ between embodiments and can be chosen to suit the style, shape, and function of the wearable item. In some embodiments, the upper material including the upcycled apple skin material can have a material composition including at least one of apple (~26%, +/−2%), polyester (~20%, +/−2%), cotton (~16%+/−2%), and polyurethane (~38%+/−2%).

In some embodiments, the upper material can include a sustainable satin material. In some embodiments, the sustainable satin material has high mechanical stability when compared to other materials. In some embodiments, a sustainable satin material can include a satin alternative composed of LENZING™ EcoVero™ certified renewable wood sources manufactured using an eco-responsible production process that generates up to 50% lower emissions and water impact when compared to generic viscose combined with GOTS organic silk. In some embodiments, the upper material can include a material similar to 1004 RASO Imperiali Sostenibili manufactured by Tessitura Attilio Imperiali S.p.A. of Italy.

In some embodiments, where the upper includes an upper material including sustainable satin material, the upper material can also include an accessory (e.g., a tie) including an accessory material. In some embodiments, the accessory material can include a bio-based sugar cane molasses material. In some embodiments, a bio-based sugar cane molasses material can have strong abrasion and tearing properties when compared to other materials. In some embodiments, the accessory material can include a bio-based polyethylene terephthalate (PET) material. In some embodiments, the accessory material can include a recycled PET material used as a reinforced backing. In some embodiments, the accessory material can be used as an alternative to leather in the form of suede. In some embodiments, the accessory material can include a material similar to 5015 Alcantara® manufactured by Alcantara S.p.A. of Italy.

In some embodiments, the upper material including the sustainable satin material can have a thickness larger than or equal to 0.60 mm and smaller than or equal to 0.70 mm. In some embodiments, the upper material can have a thickness smaller than 0.60 mm. In some embodiments, the upper material can have a thickness larger than 0.70 mm. In some embodiments, the upper material including the sustainable stain material can have a material composition including at least one of Viscose Lenzing™ Eco Vero™ (~72%) and organic silk GOTS (~18%).

In some embodiments, the upper material can include a combination of an upcycled apple skin material and a tea bag recycled yarn material. In some embodiments, the tea bag recycled yarn material can have high mechanical stability when compared to other materials. In some embodiments, the tea bag recycled yarn material can have hydrophobic properties. In some embodiments, tea bag recycled yarn can include straw paper composed of a yarn made from straw fibers obtained from the spinning of ecological straw and/or food grade paper coming from waste from the food sector including theine, chamomile fibers, vegetable tassels and nettle. In some embodiments, such materials may be compostable, biodegradable, recyclable and environmentally friendly. In some embodiments, the upper material can include a material similar to R2 Tea Bag Recycled Yarn H.70CM manufactured by R79 S.r.L. of Italy.

In some embodiments, the upper material including the tea bag recycled yarn material can have a thickness of 1.8 mm. In some embodiments, the upper material including the tea bag recycled yarn material can have a thickness of 1.8 mm with or without a cotton backing. In some embodiments, the upper material including the tea bag recycled yarn material can have a width of 6 mm. In some embodiments, the upper material including the tea bag recycled yarn material can have a material composition including FSC and PEFC Certified Virgin Paper. In some embodiments, the upper material including the tea bag recycled yarn material can have a front side with 100% ecological straw paper and a backside (or backing) with 100% cotton. In some embodiments, the upper material including the tea bag recycled yarn material can have a weight (without a backing) of 0.33 Kg per meter with a width of 70 cm. In some embodiments, the upper material including the tea bag recycled yarn material can have a weight (with a backing—e.g., 4/20 cotton yarn) of 0.44 Kg per meter with a width of 70 cm.

In some embodiments, the upper material can include a recycled polyamide yarn material. In some embodiments, the recycled polyamide yarn material can have high mechanical stability; high resistance to snagging, pilling, and abrasion; and can have a high bursting strength and recovery. For example, in some embodiments, the upper material including the recycled polyamide yarn material can have an abrasion resistance score equal to or greater than 20,000 cycles. In some embodiments, the upper material including the recycled polyamide yarn material can have a pilling rating of 4 or 5 (e.g., no visual change or slight surface fuzzing). In some embodiments, the upper material including the recycled polyamide yarn material can have a burst resistance rating greater than 50 lbf. In some embodiments, the upper material including the recycled polyamide yarn material can have a snag resistance score of 3.5 at 50 revolutions.

In some embodiments, a recycled polyamide yarn can be a yarn composed of discarded nylon material from the post-production of the manufacturing process and converted into a material which is 59% recycled polyamide and 41% elastane. In some embodiments, a recycled polyamide yarn can be a material achieving the OEKO-TEX® Standard 100 Certification or the Global Recycled Standard Certification by ICEA. In some embodiments, the upper material can include a material similar to T 98G1 Sensitive® Sculpt Reco UFD manufactured by Eurojersey S.p.A. of Italy. In some embodiments, the upper material including the recycled polyamide yarn material can have a material composition including at least one of polyamide (~59%) and elastane (~41%). In some embodiments, the upper material including the recycled polyamide yarn material can have a thickness of 0.47 mm.

In some embodiments, the upper material can include a combination of recycled polyamide yarn and upcycled apple skins. In some embodiments, the upper material can include a combination of T 98G1 Sensitive® Sculpt Reco UFD and AppleSkin™.

In some embodiments, the upper 102 can be scratch resistant. In some embodiments, the upper 102 can include an upper coating to provide scratch resistance. In some embodiments, the upper coating can be a transparent coating. In some embodiments, the upper coating can be a polyurethane coating. In some embodiments, the upper coating can include a polyurethane coating manufactured by FRUMAT S.r.L. of Italy. In some embodiments, the upper coating can be selected to provide a desired abrasion resistance, texture, consistency, and durability. In some embodiments, the upper coating can have a thickness of one-third of the combined thickness of the upper material and the upper coating. In some embodiments, the upper coating thickness may not exceed 0.15 mm. In some embodiments, the upper coating thickness may exceed 0.15 mm. In some embodiments, the upper coating can be applied in such manner that where the upper coating does not exceed a thickness of one-third of the combined thickness of the upper material and the upper coating, the upper coating does have a thickness larger than or equal to 0.15 mm.

In some embodiments, a lining 108 can include a lining material. In some embodiments, the lining material can include an upcycled apple skin material, as described above. In some embodiments, the lining material can include an upcycled grape skin material. In some embodiments, the upcycled grape skin material can be a plant-based leather alternative composed of the post-production scraps of grape waste and water-based polyurethane. In some embodiments, upcycled grape skin material can be water resistant. In some embodiments, upcycled grape skin material can be ultraviolet (UV) light resistant. In some embodiments, a lining material can include a material similar to Article VT16 manufactured by VEGEA S.r.L. of Italy. In some embodiments, a lining material can have a thickness larger than or equal to 0.80 mm and smaller than or equal to 1.00 mm. In some embodiments, a lining material can have a thickness of 0.90 mm. In some embodiments, a lining material can have a thickness smaller than 0.80 mm. In some embodiments, a lining material can have a thickness larger than 1.00 mm. As will be understood by those skilled in the art, the thickness of the lining material may differ between embodiments and can be chosen to suit the style, shape, and function of the wearable item. In some embodiments, the lining material can have a material composition including at least one of an eco-composite of grape skins (~70%) and a water-based polyurethane (~30%).

In some embodiments, the lining 108 is scratch resistant. In some embodiments, the lining 108 can include a lining coating to provide scratch resistance. In some embodiments, the lining coating can be a transparent coating. In some embodiments, the lining coating can be a water-based polyurethane coating. In some embodiments, the water-based polyurethane coating can be manufactured by FRUMAT S.r.L. of Italy. In some embodiments, the water-based polyurethane coating can be manufactured by VEGEA S.r.L. of Italy. In some embodiments, the lining coating can be selected to provide a desired abrasion resistance, texture, consistency, and durability.

In some embodiments, the lining coating can have a thickness of one-third of the combined thickness of the lining material and the lining coating. In some embodiments, the lining coating thickness may not exceed 0.15 mm. In some embodiments, the lining coating thickness may exceed 0.15 mm. In some embodiments, the lining coating can be applied in such manner that the lining coating thickness does not exceed one-third of the combined thickness of the lining material and the lining coating. In those embodiments, the lining coating can be larger than or equal to 0.15 mm.

In some embodiments, the insole can include an insole material. In some embodiments, the insole material can include an upcycled apple skin material, as discussed herein. In some embodiments, the insole material can include an upcycled grape skin material. In some embodiments, an insole material can include a material similar to Article VT16 by VEGEA S.r.L. of Italy. In some embodiments, an insole material can have a thickness larger than or equal to 0.80 mm and smaller than or equal to 1.00 mm. In some embodiments, an insole material can have a thickness of 0.90 mm. In some embodiments, an insole material can have a thickness smaller than 0.80 mm. In some embodiments, an insole material can have a thickness larger than 1.00 mm. As will be understood by those skilled in the art, the thickness of the insole material may differ between embodiments and can be chosen to suit the style, shape, and function of the wearable item. In some embodiments, an insole can have a material composition including at least one of an eco-composite of grape skins (~70%) and a water-based polyurethane (~30%).

In some embodiments, the insole can be scratch resistant. In some embodiments, the insole can include an insole coating to provide scratch resistance. In some embodiments, the insole coating can be a transparent coating. In some embodiments, the insole coating can be a water-based polyurethane coating. In some embodiments, the insole coating can be a water-based polyurethane coating manufactured by FRUMAT S.r.L. of Italy. In some embodiments, the water-based polyurethane coating can be manufactured by VEGEA S.r.L. of Italy. In some embodiments, the insole coating can be selected to provide a desired abrasion resistance, texture, consistency, and durability.

In some embodiments, the insole coating can have a thickness of one-third of the combined thickness of the insole material and the insole coating. In some embodiments, the insole coating thickness may not exceed 0.15 mm. In some embodiments, the insole coating thickness may exceed 0.15 mm. In some embodiments, the insole coating can be applied in such manner that the insole coating thickness does not exceed one-third of the combined thickness of the insole material and the insole coating. In those embodiments, the insole coating can be larger than or equal to 0.15 mm.

In some embodiments, the molded insole can include a molded insole material. In some embodiments, the molded insole material can include a recycled-carboard based material. In some embodiments, the molded insole material can comprise recycled tree fibers regenerated to make the recycled cardboard. In some embodiments, the molded insole material can include a material similar to Ecosole® by Texon Italia S.r.L. of Italy.

In some embodiments, the insole cushion can include an insole cushion material. In some embodiments, the insole cushion material can include a foam rubber. In some embodiments, the insole cushion material can include a recyclable material. In some embodiments, the insole cushion material can include a recycled material. In some embodiments, the insole cushion material can have a thickness selected to match a desired comfort and durability.

In some embodiments, the outsole 112 can include an outsole material. In some embodiments, the outsole material can include a vegetable tanned leather material. In some embodiments, the outsole material can have water-resistant or hydrophobic properties. In some embodiments, the outsole material can include a vegetable tanned leather as manufactured by Conceria 3S S.r.L. of Italy. In some embodiments, the outsole material can include a vegetable tanned leather as manufactured by Gruppo Conciario C.M.C. International S.p.A. of Italy. In some embodiments, vegetable tanned leather as used herein can be Silver Rated—Audited Against Leather Working Group (LWG) Standards. In some embodiments, vegetable tanned leather as used herein can be manufactured by a tannery rated as Category C—Raw Hide/Skin to Finished Leather and audited by Leather Working Group Environmental Auditing Protocol Issue 6.7.0. In some embodiments, an outsole material can have a material composition including at least one of cow leather (~60%), plant extracts (~15%), water (~15%), and vegetable-origin tanning agents (~10%).

In some embodiments, the toe puff 104 can include a toe puff material. In some embodiments, the toe puff material can provide increased resistance and shape retention when compared to other materials. In some embodiments, the toe puff material can include recycled ethylene-vinyl acetate ("EVA"). As will be noted, EVA is a copolymer of ethylene and vinyl acetate. In some embodiments, recycled EVA can be a reusable plastic waste that is soft and flexible with a rubber-like feel. In some embodiments, the toe puff material can include a material similar to Talyn® S by Technogi S.p.A. of Italy. In some embodiment, the toe puff material comprises EVA that would otherwise be manufacturing waste (e.g., cutting and skiving waste). In some embodiments, the toe puff material can include a metal.

In some embodiments, the toe puff material can have a thickness larger than or equal to 0.30 mm and smaller than or equal to 1.00 mm. In some embodiments, the toe puff material can have a thickness smaller than 0.30 mm. In some embodiments, the toe puff material can have a thickness larger than 1.00 mm. As will be understood by those skilled in the art, the thickness of the toe puff material may differ between embodiments and can be chosen to suit the style, shape, and function of the wearable item. In some embodiments, the outsole can have a material composition including at least one of recycled raw material (~41%) and manufacturing waste (~9%).

In some embodiments, the toe puff 104 can be secured to at least one other layer or material by bonding. In some embodiments, the toe puff 104 can be secured to the upper 102 by bonding. In some embodiments, a bonding process can be accomplished using a pneumatic pressing machine equipped with heated curved plate, timer, and thermostat. In some embodiments, during the bonding process the toe puff 104 can be maintained at a temperature between 130 and 150 degrees Celsius. In some embodiments, the bonding process can have a minimum effective interface temperature of about 100 degrees Celsius. In some embodiments, the bonding process can have a contact time of about 6 to 12 seconds. It will be noted by those skilled in the art, that the contact time can vary depending on the thickness of the articles being bonded and the characteristics of the materials involved.

In some embodiments, the counter 116 can include a counter material. In some embodiments, the counter material can include regenerated leather. In some embodiments, regenerated leather can be made with materials that come from post-production of another product. For example, production scraps that did not deem fit for final production of a product or production scraps from the end of the production of a product. In some embodiments, regenerated leather can be leather that is produced when leather scraps go through a production process that compresses its fibers to create a new raw material. In some embodiments, the counter material can include regenerated leather as manufactured by Salamander Bonded Leather GmbH & Co. KG of Germany. In some embodiments, the counter material can be a material with good moldability, good shape retention and good elasticity.

In some embodiments, the counter material can include bonded leather. In some embodiments, bonded leather includes leather fibers from manufacturing waste (e.g., scraps). In some embodiments, bonded leather can be manufactured by shredding leather scraps and leather fiber, then mixing it with bonding materials. In some embodiments, regenerated leather exhibits to a great extent the same properties as the natural product leather typically used to make counters, therefore regenerated leather can be treated the same as natural leather. In some embodiments, the counter can have a thickness larger than or equal to 1.50 mm and smaller than or equal to 1.60 mm. In some embodiments, the counter can have a thickness smaller than 1.50 mm. In some embodiments, the toe counter can have a thickness larger than 1.60 mm.

In some embodiments, the heel 114 can include a heel material. In some embodiments, the heel material can include a plastic or polymer. In some embodiments, the heel material can include a material similar to ELIX™ ABS P2MC by ELIX Polymers SLU of Spain.

In some embodiments, the heel 114 can include a heel layer. In some embodiments, the heel layer can include a heel layer material. In some embodiments, the heel layer material can include a plastic. In some embodiments, the heel layer material can include a material similar to plastics manufactured by Tacchificio Ares Plastic S.r.L. of Italy. In some embodiments, plastics and polymers can be used in heels and heel layers to increase durability.

As noted above, securing layers and components of wearable items can be achieved using adhesives. The following discussion relates to adhesives that can be used in sustainable wearable items (e.g., wearable item 100). In some embodiments, an adhesive includes an adhesive material. In some embodiments, the adhesive can include a solvent-based polyurethane adhesive. In some embodiments, the adhesive can include polyurethane resin in a blend of organic solvents. In some embodiments, the adhesive can include a two-part adhesive with high penetration onto porous substrates, good green strength, and high tackiness under heat conditions. In some embodiments, the adhesive can be resistant to grease emanating from leathers, plasticizers of PVC, and water. In some embodiments, the adhesive can be suitable for bonding leather and synthetic upper materials to styrene-butadiene rubber (SBR) vulcanized rubber soles, nonvulcanized or thermoplastic rubber (TR), Thunit, Polyurethane, and polyvinyl chloride (PVC). In some embodiments, the adhesive can be suitable for bonding low hardness rubber soles. In some embodiments, the adhesive can include an adhesive similar to E.S. XM/87 Glue manufactured by FRATELLI ZUCCHINI S.p.A. of Italy.

In some embodiments, the adhesive can have a transparent appearance. In some embodiments, the adhesive can have an opalescent clear appearance. In some embodiments, the adhesive can be a liquid. In some embodiments, an adhesive can have a viscosity of about 1800-2100 mPas when measured using viscometer similar to viscometers manufactured by AMETEK® Brookfield of Middleboro, MA on a 4-spindle setting at 50 RPM and 25 degrees Celsius.

In some embodiments, prior to a bonding process using an adhesive as described herein, the components to be bonded can be brushed or roughed to create a better bond when compared to comparatively smoother surfaces. For example, in some embodiments, when bonding the outsole material including vegetable tanned leather to other parts of the wearable item 100, each part should be roughed and brushed.

In some embodiments, where it is necessary to improve adhesive penetration, a primer can be used. In some embodiments, to improve adhesive penetration, an accelerator can be used with the primer. In some embodiments, the primer can include a primer similar to Primer 144/F manufactured by FRATELLI ZUCCHINI S.p.A. of Italy. In some embodiments, the primer can include a primer similar to Primer C manufactured by FRATELLI ZUCCHINI S.p.A. of Italy. In some embodiments, the accelerator can include an accelerator similar to Desmodur RE/RFE manufactured by FRATELLI ZUCCHINI S.p.A. of Italy. For example, in some embodiments, to improve adhesive penetration, a first coat of Primer 144/F or Primer C with 3% Desmodur accelerator can be applied to the parts to be bonded.

In some embodiments, prior to the bonding process the components to be bonded can be cleaned using a solvent. In some embodiments, the solvent can include a solvent similar to Solvente ST/141 manufactured by FRATELLI ZUCCHINI S.p.A. of Italy. For example, in some embodiments, when bonding the upper 102, the lining 108, the insole, the insole cushion, the toe puff 104, and the counter 116, the components should be clean with a solvent such as Solvente ST/141 or equivalent.

In some embodiments, during the bonding process, a coat of adhesive can be applied onto the two surfaces to be bonded. In some embodiments, if a first coat of primer is required, the primer can be applied about 5-10 minutes in advance of applying the adhesive. In some embodiments, the adhesive can be left to dry between 20-30 minutes or for a period of time sufficient to allow the solvent to evaporate. Then, in some embodiments, the parts can be heated to a temperature ranging between 50-60 degrees Celsius to activate the adhesive. In some embodiments, once the adhesive is ready, the two parts to be bonded are brought together and a pressure force of approximately 4-5 bars is applied for approximately 10-12 seconds (e.g., dwell time). In some embodiments, the high green strength and the ease of impact of the adhesive film described herein can allow the bonding to take place even if one of the parts is not sufficiently heated. In some embodiments, bond strength can gradually increase with time to reach a maximum value in 2 to 3 days after bonding. Thus, in some embodiments, a user can wait a period of prior to 2 to 3 days after bonding prior to manipulating the bonded parts.

Figure 2:
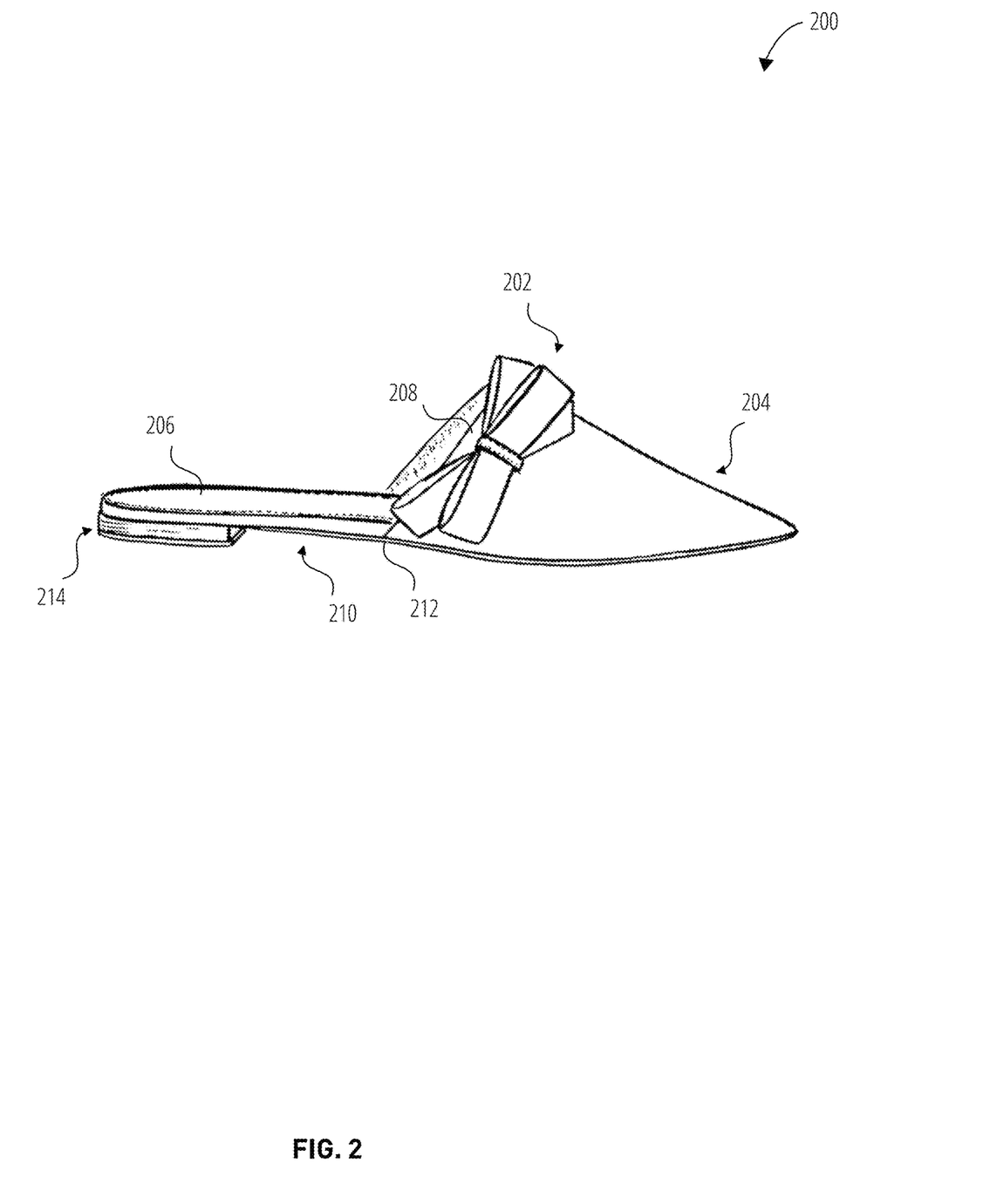
FIG. 2 is a side view of a sustainable wearable item according to some embodiments.

FIG. 2 is a side view of a sustainable wearable item according to some embodiments.

In some embodiments, a sustainable wearable item 200 can include an upper 202, a toe puff 204, an insole 206, a lining 208, a bottom 210, an outsole 212, and a heel 214. In some embodiments, wearable item 200 can include a molded insole (not shown). In some embodiments, wearable item 200 can have the same parts and materials and be manufactured by the same processes and methods as described with respect to wearable item 100 in FIG. 1.

In some embodiments, upper 202 can include an upper material, as discussed with respect to FIG. 1. In some embodiments, the upper material can include an upcycled apple skin material. In some embodiments, toe puff 204 can include a toe puff material, as discussed with respect to FIG. 1. In some embodiments, the toe puff material can include recycled EVA. In some embodiments, insole 206 can include an insole material, as discussed with respect to FIG. 1. In some embodiments, the insole material can include a material selected from the group consisting of an upcycled apple skin material and an upcycled grape skin material. In some embodiments, lining 208 can include a lining material, as discussed with respect to FIG. 1. In some embodiments, the lining material can include a material selected from the group consisting of an upcycled apple skin material and an upcycled grape skin material. In some embodiments, outsole 212 can include an outsole material, as discussed with respect to FIG. 1. In some embodiments, the outsole material can include vegetable tanned leather. In some embodiments, molded insole can include a molded insole material, as discussed with respect to FIG. 1. In some embodiments, the molded insole material can include recycled carboard. In some embodiments, the heel 214 can include a heel material, as discussed with respect to FIG. 1. In some embodiments, the heel material can include a plastic or polymer.

Figure 3:
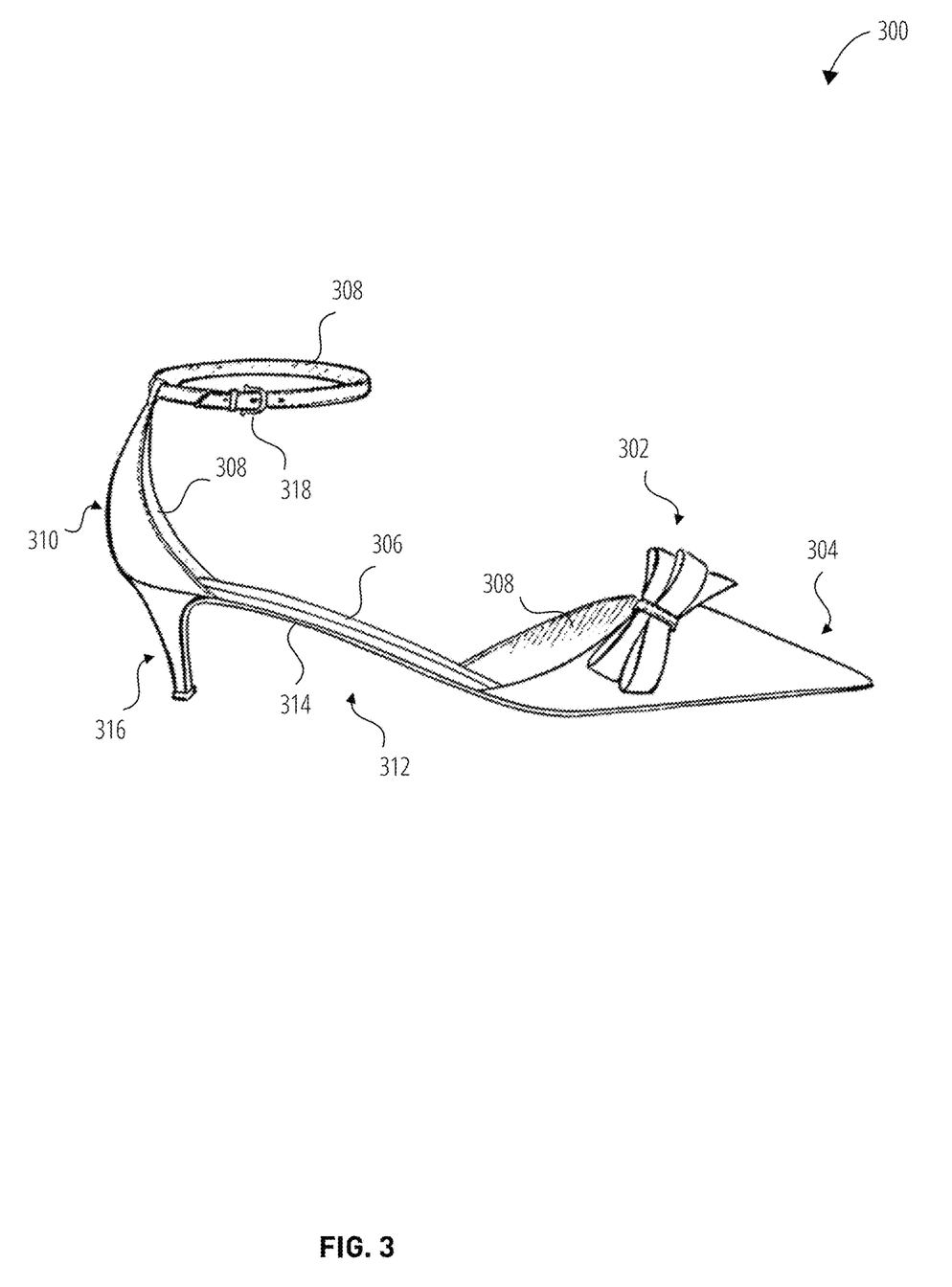
FIG. 3 is a side view of a sustainable wearable item according to some embodiments.

FIG. 3 is a side view of a sustainable wearable item according to some embodiments.

In some embodiments, a sustainable wearable item 300 can include an upper 302, a toe puff 304, an insole 306, a lining 308, a counter 310, a bottom 312, an outsole 314, a heel 316, and a clasp 318. In some embodiments, wearable item 300 can include a molded insole (not shown). In some embodiments, wearable item 300 can have the same parts and materials and be manufactured by the same processes and methods as described with respect to wearable item 100 in FIG. 1.

In some embodiments, upper 302 can include an upper material, as discussed with respect to FIG. 1. In some embodiments, the upper material can include an upcycled apple skin material. In some embodiments, toe puff 304 can include a toe puff material, as discussed with respect to FIG. 1. In some embodiments, the toe puff material can include recycled EVA. In some embodiments, insole 306 can include an insole material, as discussed with respect to FIG. 1. In some embodiments, the insole material can include a material selected from the group consisting of an upcycled apple skin material and an upcycled grape skin material. In some embodiments, lining 308 can include a lining material, as discussed with respect to FIG. 1. In some embodiments, the lining material can include a material selected from the group consisting of an upcycled apple skin material and an upcycled grape skin material. In some embodiments, outsole 314 can include an outsole material, as discussed with respect to FIG. 1. In some embodiments, the outsole material can include vegetable tanned leather. In some embodiments, molded insole can include a molded insole material, as discussed with respect to FIG. 1. In some embodiments, the molded insole material can include recycled carboard. In some embodiments, counter 310 can include a counter material, as discussed with respect to FIG. 1. In some embodiments, the counter material can include regenerated leather. In some embodiments, the heel 316 can include a heel material, as discussed with respect to FIG. 1. In some embodiments, the heel material can include a plastic or polymer.

In some embodiments, the clasp 318 can be used to secure part of the upper 302 and/or counter 310 around an ankle of a user. In some embodiments, clasp 318 can be a buckle. As used herein, a buckle refers to a device used for fastening two loose ends. In some embodiments, the clasp 318 can be a device with interlocking parts used to secure two pieces of material to each other. In some embodiments, the clasp 318 can include a clasp material. In some embodiments, the clasp material can include a nickel free metal (i.e., metal substantially devoid of nickel) as manufactured by Metal Services S.r.L. of Italy. In some embodiments, the clasp material can include a chrome free material.

Figure 4:
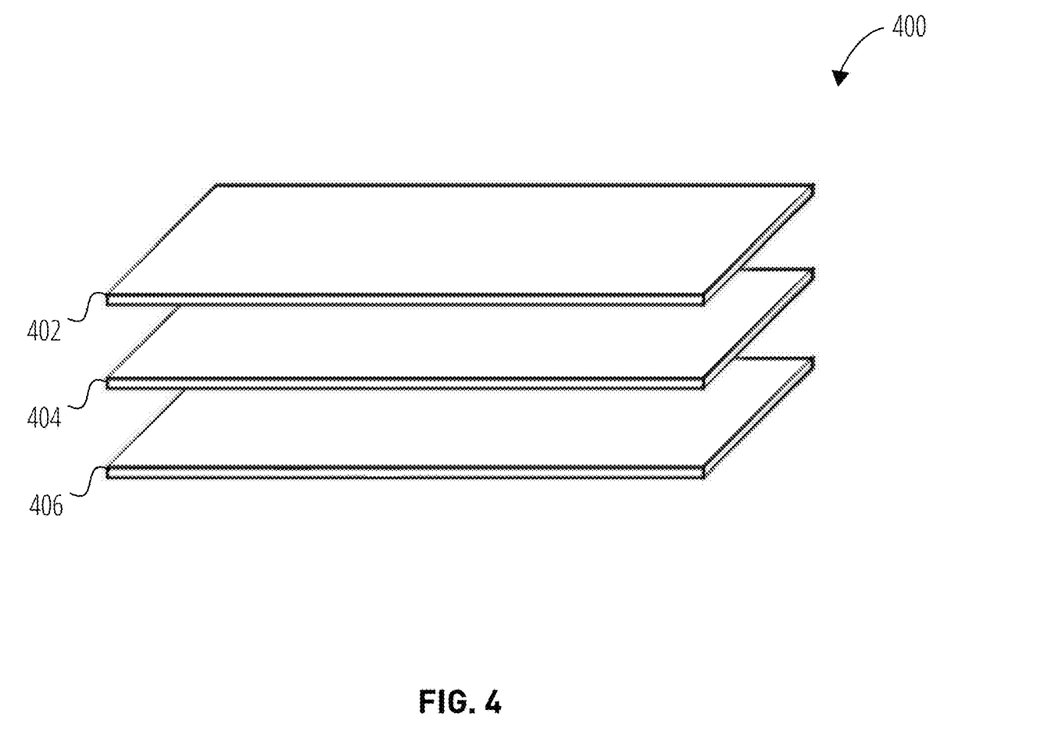
FIG. 4 is a schematic of a layer arrangement of a sustainable wearable item according to some embodiments.

FIG. 4 is a schematic of a layer arrangement of a sustainable wearable item according to some embodiments.

In some embodiments, a layer arrangement 400 of a wearable item (e.g., wearable item 100, wearable item 200, wearable item 300) can include an upper layer 402, an adhesive 404, and a lining 406. In some embodiments, the layer arrangement 400 can be a layer arrangement of an upper of a wearable item. In some embodiments, the lining 406 can be an inner layer. In some embodiments, upper layer 402 can be an outer layer.

In some embodiments, the upper layer 402 can include an upcycled apple skin material. In some embodiments, adhesive 404 can include a polyurethane resin. In some embodiments, the lining 406 can include an upcycled apple skin material. In some embodiments, the lining 406 can include an upcycled grape skin material. In some embodiments, the upper layer 402 can be secured to the lining 406 with the adhesive 404 using a bonding process as described herein.

Figure 5:
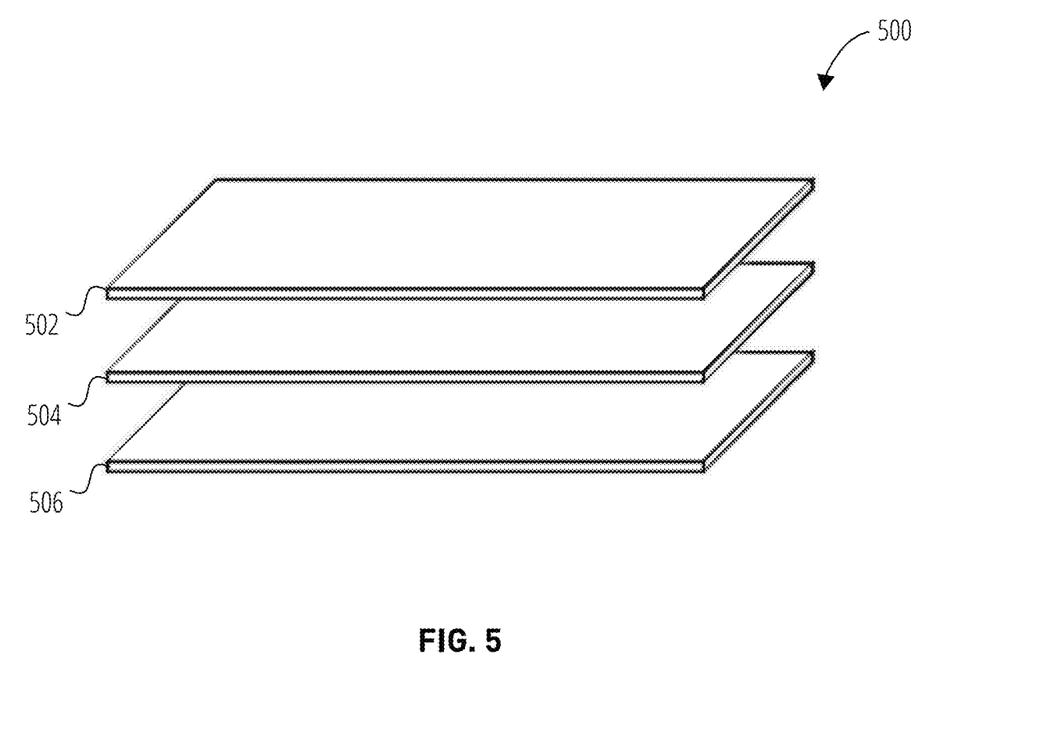
FIG. 5 is a schematic of a layer arrangement of a sustainable wearable item according to some embodiments.

FIG. 5 is a schematic of a layer arrangement of a sustainable wearable item according to some embodiments.

In some embodiments, a layer arrangement 500 of a wearable item (e.g., wearable item 100, wearable item 200, wearable item 300) can include an insole 502, an adhesive 504, and an outsole 506. In some embodiments, the layer arrangement 500 can be a layer arrangement of a bottom of a wearable item. In some embodiments, insole 502 can be an inner layer. In some embodiments, the outsole 506 can be an outer layer.

In some embodiments, the insole 502 can include an upcycled apple skin material. In some embodiments, the insole 502 can include an upcycled grape skin material. In some embodiments, adhesive 504 can include a polyurethane resin. In some embodiments, outsole 506 can include a vegetable tanned leather material. In some embodiments, the insole 502 can be secured to the outsole 506 with the adhesive 504 using a bonding process as described herein.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method of manufacturing a sustainable wearable item, the method comprising:
    preparing an inner layer and an outer layer;
    applying an adhesive to at least one of the inner layer and the outer layer, the inner layer comprising a plant-based material, the outer layer comprising animal hide-based material;
    activating the adhesive by heating the at least one of the outer layer and the inner layer;
    compressing the outer layer and the inner layer; and
    waiting a period of time prior to manipulating the layers.

2. The method of claim 1, wherein activating the adhesive includes heating the at least one of the outer layer and the inner layer to between 50 and 60 degrees Celsius.

3. The method of claim 1, wherein compressing the outer layer and the inner layer includes applying a pressure of between 4 and 5 bars for between 10 and 12 seconds.

4. The method of claim 1, wherein preparing the inner layer and the outer layer comprises at least one of brushing or roughing at least one of the inner layer and the outer layer.

5. The method of claim 1, wherein waiting comprises a period of time between 2 and 3 days.

6. The method of claim 1, wherein the plant-based material of the inner layer includes a material selected from the group consisting of an upcycled apple skin material and an upcycled grape skin material; and wherein the outer layer has a thickness between 0.80 mm and 1.00 mm.

7. The method of claim 1, wherein the animal hide-based material of the outer layer includes a vegetable tanned leather material.

8. The method of claim 1, wherein the adhesive is a polyurethane adhesive.

9. The method of claim 1, wherein the animal hide-based material of the outer layer includes vegetable tanned leather.

10. A method of manufacturing a sustainable wearable item, the method comprising:
    applying an adhesive to at least one of an outer layer and an inner layer, the outer layer and the inner layer comprising a plant-based material;
    activating the adhesive by heating the at least one of the outer layer and the inner layer;
    compressing the outer layer and the inner layer; and
    waiting a period of time prior to manipulating the layers.

11. The method of claim 10, wherein the step of compressing includes applying a pressure of between 4 and 5 bars.

12. The method of claim 11, wherein the step of compressing includes applying pressure for between 10 and 12 seconds.

13. The method of claim 10, wherein the step of activating the adhesive includes heating the at least one of the outer layer and the inner layer to between 50 and 60 degrees Celsius.

14. The method of claim 10, wherein the step of waiting comprises a period of time between 2 and 3 days.

15. The method of claim 10, wherein the plant-based material of the inner layer comprises an upcycled apple skin material; and wherein the outer layer has a thickness between 0.90 mm and 1.0 mm.

16. The method of claim 10, wherein the plant-based material of the inner layer comprises an upcycled grape skin material; and the inner layer has a thickness between 0.80 mm and 1.00 mm.

17. The method of claim 10, wherein the adhesive is a polyurethane adhesive.

* * * * *